3,210,327
Patented Oct. 5, 1965

3,210,327
SYMMETRICAL DIOL ALKYL ESTERS OF ACRYLIC ACIDS AND POLYMERS THEREOF
Francis R. Galiano and Gerald J. Mantell, Kansas City, Mo., and David Rankin, Kansas City, Kans., assignors, by mesne assignments, to Gulf Oil Corporation, Pittsburgh, Pa., a corporation of Pennsylvania
No Drawing. Filed May 23, 1962, Ser. No. 196,914
36 Claims. (Cl. 260—80.5)

This invention relates to novel diol compounds. More particularly, it relates to novel symmetrical diols consisting of 1,3-prtpane diols having a 2-acrylic ester substituent. The compounds are represented by the following formula:

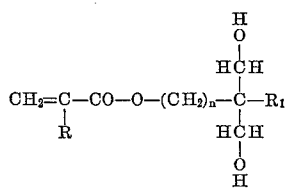

wherein R is a hydrogen or a lower alkyl radical (preferably hydrogen or methyl), $R_1$ is a lower alkyl radical having one to four carbon atoms or hydrogen, and "$n$" represents an integer from one to four, inclusive.

The symmetrical diols of this invention are generally relatively high boiling liquids. They are water-soluble and are in general soluble in polar solvents such as lower alkanols, e.g., methanol and ethanol, and in acetone, dioxane, ethyl acetate, and the like. The compounds of this invention can be homopolymerized or copolymerized with another polymerizable ethylenically unsaturated compound to form interpolymers. The polymers thereby provided have the interesting characteristic of being in most instances soluble in solvent combinations of water and water-miscible polar solvent such as acetone, ethanol, and the like. However, they on the other hand are not generally readily solubilized in water alone.

Additionally, since the compounds are symmetrical diols as to both hydroxy functional groups, the compounds are readily reacted with a dicarboxylic acid agent to form polyesters. In polyester preparation, suitable elevated reaction temperatures will be used. Customary catalysts used by the skill of the art in polyester formation are desirably utilized. Suitable dicarboxylic acids for the ester formations include both aryl and aliphatic dicarboxylic acids illustrative of which are succinic, adipic, o-phthalic, terephthalic, sebacic, 1,4-naphthalene-dicarboxylic, azelaic, glutaric, 3-ethylsebacic, and the like carboxylic acids. When appropriate, corresponding acid halides or anhydrides can be employed as the dicarboxylic acid agent. Relative proportions of the diols and dicarboxylic acids will be selected to insure polyester formation.

An important virtue of these polyesters is that they can be readily cured to form thermoset polymers conventionally by heating an admixture of the polymer and a catalytic amount of a free radical initiator such as a suitable peroxide, e.g., t-butyl perbenzoate. If desired, a quantity of a monomer can be added in preparation of the thermoset polymers to promote the linking of a double bonds of the acrylic substituents. Such monomers having unsaturation as styrene, triallyl isocyanurate, and the like can be employed for this purpose.

Furthermore, polyurethanes can be provided by reacting the diol with an organic diisocyanate such as toluene diisocyanate and hexamethylene diisocyanate, and the like.

The diols of this invention can readily be prepared as by a mild aqueous acid hydrolysis of 5-alkylene-m-dioxanyl acrylic esters such as disclosed in U.S. patent application filed concurrently herewith, Serial No. 196,916, by David Rankin et al. The following equation illustrates the hydrolysis procedure:

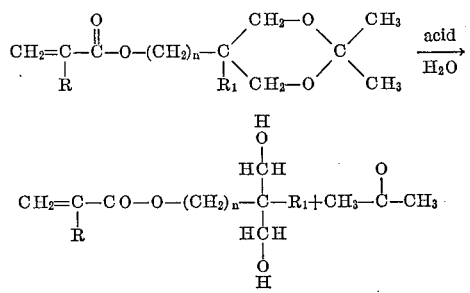

wherein R, $R_1$, and $n$ have the definitions set forth above. The carbon atom occupying position 2 in the dioxanyl ring can have any substituents to fulfill the valence requirements so long as the substituents do not prevent the necessary hydrolysis. The substituents are desirably both lower alkyl, suitably methyl, because of the relative ease by which such ketals hydrolyse to the desired compounds and the economy of such intermediates. However, other compounds having one or both substituents other than methyl can be employed. Illustratively speaking, the substituents can alternatively be ethyl, propyl, phenyl, or the like.

The hydrolysis is carried on by adding a suitable amount of the acrylic dioxanyl ester to an inert aqueous reaction solvent. Water is a satisfactory reaction solvent. The mixture is acidified by adding a suitable acid. Mineral acids such as hydrochloric and sulfuric acid are satisfactory for this purpose. The pH of the reaction mixture is advisably lowered to about pH 5 or below, preferably to a pH in the range of about pH 2 to about pH 4. The reaction temperature can be room temperature but presently is preferred to be slightly above to provide a more efficient and rapid hydrolysis, e.g., a temperature in the range of about 30° C. to about 60° C. is ordinarily satisfactory. A reaction time of from about one-half to about ten hours is ordinarily sufficient, depending on conditions and the intermediate employed. The reaction mixture is neutralized, is filtered, and the desired product is isolated as by extraction. Chloroform has been found to be a satisfactory extractant for aqueous reaction mixtures.

The ester exchange reactions by which the intermediate dioxanyl ester compounds of this invention are provided are conducted at an elevated temperature at which the desired 5-m-dioxanyl acrylic ester is stable. Ordinarily it has been found useful to include in the reaction an ester exchange catalyst such as an alkyl titanate, e.g., tetrabutyl titanate, or any other useful ester exchange catalyst such as an alkali metal alkoxide, or an alkali metal oxide, hydride, or hydroxide, or the like. The catalysts can be employed in general in amounts which are catalytic in ester exchange reactions. In illustration, the 5-m-dioxanyl acrylic esters are provided by the following reaction:

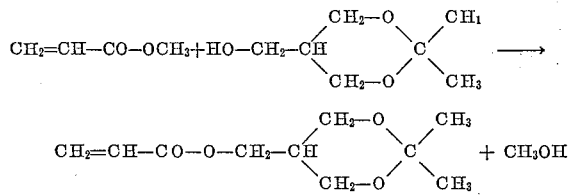

The desired acrylic dioxanyl esters are isolated from the ester exchange reaction mixture by conventional procedures. For example, a relatively crude fraction of the desired dioxanyl esters can be obtained from the reaction mixture by fractional distillation. The crude products can be further purified as by extraction, precipitation, or distillation procedures of common knowledge to the art. In treating the reaction mixture, it is advisable to destroy any residual catalyst activity prior to isolation treatment as by adding water to the reaction mixture and by extraction of the desired compound therefrom with an inert water immiscible solvent in which the desired ester is soluble, for example, benzene, toluene, and the like.

The 5-hydroxyalkylene-m-dioxanyl alcohols can be provided following conventional condensation procedures illustrated by the following reaction:

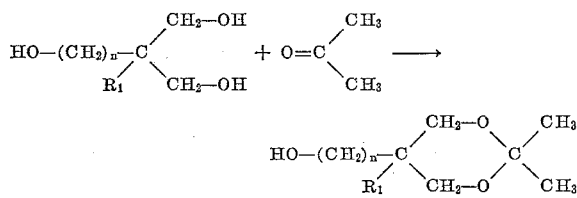

The symmetrical diols of this invention can be polymerized by following known methods for polymerizing acrylic type monomers. Polymerization can be conducted following bulk, solution, suspension, or emulsion polymerization techniques. Presently, it appears that solution polymerization results in a polymer having less cross linking and correspondingly greater solvent solubility than polymers produced by standard emulsion polymerizations. Conventional catalysts can be employed, and are ordinarily advisably used. Such referred to conventional polymerization catalysts include peroxide free-radical initiators such as benzoyl peroxide, tertiary butyl hydroperoxide, and tetriary butyl perbenzoate and the like; azo-type free-radical catalysts such as alpha, alpha'-azobis(isobutyronitrile), alpha, alpha'-azobis(ethyl isobutyrate), alpha, alpha'-azobis(isobutyramide), and the like; and persalts such as potassium persulfate and the like. It is desirable that the diol be free of ester exchange by-products on polymerization, such as bis-esters, for example, 2-hydroxymethyl-2-methyl-1,3-propane diol bisacrylate or methacrylate.

The compounds of this invention can also be copolymerized with one or more ethylenically unsaturated monomers polymerizable therewith such as the alkyl esters of acrylic or methacrylic acid such as methyl methacrylate, ethyl acrylate, octyl acrylate, and benzyl acrylate, acrylamides such as methacrylamide; vinyl esters such as vinyl chloride and vinyl acetate; vinylidene chloride; acrylonitrile; allyl compounds such as diallyl adipate; vinyl aryl compounds such as styrene and divinyl benzene; and other unsaturated compounds like butadiene and maleic anhydride. It is to be understood that at times some of the above mentioned monomers will not polymerize in all concentrations or in all proportions with all of the 1,3-propane diols provided by this invention. However, copolymers of this invention can be provided wherein a very small but effective quantity of one or more of the above diols are incorporated. For example, an effective quantity of a symmetrical diol can be as small as about one percent by weight up to about ninety-nine percent by weight. Preferably, the diols of this invention are contained in the polymers of the order of at least about two to about ninety percent by weight. It is to be understood that the exact concentration will vary depending upon the particular diol employed as well as the other ethylenically unsaturated monomer or monomers employed.

It is to be further understood that copolymers can be made with a mixture of two or more of the novel diols with or without utilization of additional ethylenically unsaturated monomers.

Certain agents and certain controls can be usefully employed in the polymerizations involving the acrylic ester. For example, control of temperatures and pressures can greatly contribute to the character of the end polymer products. It has been found that, when oxygen is excluded in for example a solution polymerization of the m-dioxanyl acrylic ester, the end polymers are relatively solvent soluble. However, if oxygen is present during the polymerization, apparently cross linking occurs and the end polymers are largely solvent insoluble. Certain agents acting as telogens can be employed. If emulsion polymerization is employed, emulsifying agents will be added such as fatty acid soaps, fatty acid esters of polyalkylene glycols, sulfated alcohols, or the like.

The polymers provided hereby are useful in coating various objects, as adhesives and are useful in molding and casting operations. For example, the polymer can be ordinarily dissolved in a suitable solvent and laid down as a cast film. The end polymers can be foamed or they can be cross-linked as by application of heat or by the incorporation into the polymer mix a free radical providing catalyst such as peroxide catalyst.

The following examples illustrate the provided invention but are not to be interpreted as being in limitation thereof except as defined by the appended claims.

*Example 1*

A quantity of (2,2,5-trimethyl-5m-dioxanyl)methyl acrylate (5 g.) is added to 100 ml. of water and the solution pH is adjusted to pH 3 by the addition with stirring of dilute aqueous hydrochloric acid. The two phase reaction mixture is heated to 40°–45° C. for 2 hrs. during which time the two phases become miscible. The reaction mixture is cooled, is neutralized by the addition of solid potassium carbonate, and is filtered. The filtered aqueous solution is extracted three times with chloroform. After drying over anhydrous sodium sulfate, the chloroform is removed leaving a residue of beta, beta-(bishydroxymethyl)propyl acrylate. The infrared spectrum of the product was in confirmation that the product is the propylene glycol desired.

The above procedure is repeated employing (2,2,5-trimethyl-5-m-dioxanyl)methyl methacrylate as the starting compound to provide the corresponding beta, beta-(bishydroxymethyl)propyl methacrylate.

*Example 2*

The following additional 1,3-propane diols of this invention can be provided by following essentially the ring hydrolysis process of Example 1. The appropriate $RR_1$-substituted 5-alkylene-m-dioxanyl arcylic esters are employed where in the dioxanyl portion has the following structure:

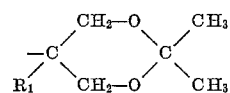

The required acrylic dioxanyl intermediate is prepared according to the general procedure hereinabove set forth and also described in the cited copending application.

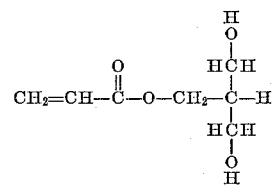

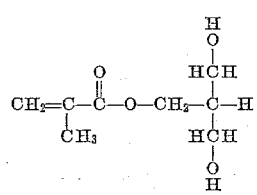

$$CH_2=CH-\underset{O}{\overset{O}{C}}-O-CH_2-CH_2-\underset{\underset{\underset{H}{O}}{HCH}}{\overset{\overset{H}{O}}{\overset{|}{\underset{|}{C}}}}-CH_3$$

$$CH_2=\underset{CH_3}{\overset{|}{C}}-\underset{O}{\overset{O}{C}}-O-CH_2-CH_2-\underset{\underset{\underset{H}{O}}{HCH}}{\overset{\overset{H}{O}}{\overset{|}{\underset{|}{C}}}}-CH_3$$

$$CH_2=CH-\underset{O}{\overset{O}{C}}-O-CH_2-CH_2-\underset{\underset{\underset{H}{O}}{HCH}}{\overset{\overset{H}{O}}{\overset{|}{\underset{|}{C}}}}-H$$

$$CH_2=\underset{CH_3}{\overset{|}{C}}-\underset{O}{\overset{O}{C}}-O-CH_2-CH_2-\underset{\underset{\underset{H}{O}}{HCH}}{\overset{\overset{H}{O}}{\overset{|}{\underset{|}{C}}}}-H$$

$$CH_2=CH-\underset{O}{\overset{O}{C}}-O-CH_2-CH_2-\underset{\underset{\underset{H}{O}}{HCH}}{\overset{\overset{H}{O}}{\overset{|}{\underset{|}{C}}}}-C_2H_5$$

$$CH_2=\underset{CH_3}{\overset{|}{C}}-\underset{O}{\overset{O}{C}}-O-CH_2-CH_2-\underset{\underset{\underset{H}{O}}{HCH}}{\overset{\overset{H}{O}}{\overset{|}{\underset{|}{C}}}}-C_2H_5$$

$$CH_2=CH-\underset{O}{\overset{O}{C}}-O-CH_2-\underset{\underset{\underset{H}{O}}{HCH}}{\overset{\overset{H}{O}}{\overset{|}{\underset{|}{C}}}}-C_2H_5$$

$$CH_2=\underset{CH_3}{\overset{|}{C}}-\underset{O}{\overset{O}{C}}-O-CH_2-\underset{\underset{\underset{H}{O}}{HCH}}{\overset{\overset{H}{O}}{\overset{|}{\underset{|}{C}}}}-C_2H_5$$

$$CH_2=CH-\underset{O}{\overset{O}{C}}-O-CH_2-\underset{\underset{\underset{H}{O}}{HCH}}{\overset{\overset{H}{O}}{\overset{|}{\underset{|}{C}}}}-C_3H_7$$

$$CH_2=\underset{CH_3}{\overset{|}{C}}-\underset{O}{\overset{O}{C}}-O-CH_2-\underset{\underset{\underset{H}{O}}{HCH}}{\overset{\overset{H}{O}}{\overset{|}{\underset{|}{C}}}}-C_3H_7$$

$$CH_2=CH-\underset{O}{\overset{O}{C}}-O-CH_2-CH_2-CH_2-CH_2-\underset{\underset{\underset{H}{O}}{HCH}}{\overset{\overset{H}{O}}{\overset{|}{\underset{|}{C}}}}-CH_3$$

$$CH_2=\underset{CH_3}{\overset{|}{C}}-\underset{O}{\overset{O}{C}}-O-CH_2-CH_2-CH_2-CH_2-\underset{\underset{\underset{H}{O}}{HCH}}{\overset{\overset{H}{O}}{\overset{|}{\underset{|}{C}}}}-CH_3$$

$$CH_2=CH-\underset{O}{\overset{O}{C}}-O-CH_2-CH_2-CH_2-\underset{\underset{\underset{H}{O}}{HCH}}{\overset{\overset{H}{O}}{\overset{|}{\underset{|}{C}}}}-CH_3$$

$$CH_2=\underset{CH_3}{\overset{|}{C}}-\underset{O}{\overset{O}{C}}-O-CH_2-CH_2-CH_2-\underset{\underset{\underset{H}{O}}{HCH}}{\overset{\overset{H}{O}}{\overset{|}{\underset{|}{C}}}}-CH_3$$

$$CH_2=\underset{\underset{CH_3}{CH_2}}{\overset{|}{C}}-\underset{O}{\overset{O}{C}}-O-CH_2-CH_2-CH_2-\underset{\underset{\underset{H}{O}}{HCH}}{\overset{\overset{H}{O}}{\overset{|}{\underset{|}{C}}}}-H$$

$$CH_2=\underset{\underset{CH_3}{CH_2}}{\overset{|}{C}}-\underset{O}{\overset{O}{C}}-O-CH_2-\underset{\underset{\underset{H}{O}}{HCH}}{\overset{\overset{H}{O}}{\overset{|}{\underset{|}{C}}}}-CH_3$$

*Example 3*

The polymerization of beta, beta-(bishydroxymethyl) propyl methacrylate is carried out in an emulsion system. Sodium lauryl sulfate (0.2 g.) is dissolved in 7 ml. of distilled water and 6.4 g. of the methacrylate is added. This mixture is placed in an addition funnel and is shaken vigorously to dissolve the monomer. Potassium persulfate (32 g. in 4 ml. of water) and the monomer are added to a 100-ml., round-bottom flask equipped with a paddle stirrer, a reflux condenser and a gas inlet. The reaction mixture is heated to 90° C. under an argon atmosphere and is stirred rapidly. After thirty minutes the remaining monomer emulsion is added dropwise over a one-hour period. The reaction temperature is maintained for an additional approximately forty-five minutes, whereupon the emulsion solidifies. The homopolymer product of beta, beta-(bishydroxymethyl)propyl methacrylate is relatively solvent insoluble.

The homopolymer of beta, beta-(bishydroxymethyl) propyl arcylate disclosed in Example 1 can be homopolymerized following the above emulsion polymerization procedure. Likewise, the monomers of Example 2 can be homopolymerized by this emulsion polymerization procedure.

*Example 4*

A solution copolymerization of beta, beta-(bishydroxymethyl)propyl methacrylate, styrene, and n-butyl methacrylate is carried out as follows: twenty milliliters of a butanol-xylene solvent (1:1 by volume) is refluxed under argon for one-half hour in a 100-ml., three-neck, round bottom flask equipper with a gas inlet, reflux condenser, syringe cap, and a magnetic stirring bar. Argon is also bubbled through a mixture of monomers, 57 g. of the methacrylate, 84 g. of styrene, and 51 g. of n-butyl methacrylate for one-half hour at room temperature. A quantity of 0.4 g. of alpha, alpha'-azobis(isobutyronitrile) is then dissolved in 19.2 g. of the above monomer mixture. The monomer catalyst mixture is added dropwise with a syringe to the heated solvent mixture over a period of one-half hour. The reaction mixture is then heated for six hours at reflux temperature. After cooling, the reaction mixture is filtered to remove a slight amount of solid material. The filtrate contains the terpolymer of beta, beta-(bishydroxymethyl)propyl methacrylate, styrene, and n-butyl methacrylate.

*Example 5*

The procedure of Example 4 is repeated employing the following comonomer mixture: 26.5 g of beta, beta-(bishydroxymethyl)propyl methacrylate, 44 g. of styrene, and 20 g. of n-butyl methacrylate.

Additionally, following the polymerization procedures set out in Examples 3 and 4 above, the remaining 1,3-propane diols of Examples 1–2 can be homopolymerized and copolymerized with copolymerizable ethylenically unsaturated monomers, e.g., acrylonitrile, butadiene, styrene, methyl acrylate, and the like.

*Example 6*

The terpolymers provided by Examples 4 and 5 above are cured according to following procedure: Solutions of the terpolymers are thoroughly mixed with 30 percent by weight of a butylated melamine formaldehyde liquid resin product having a 50 percent solids content (the product is sold under the trademark Cymel 245-8 by American Cyanamid Company). The curing admixture is heated for one-half hour at 150° C. at a pressure of one atmosphere.

The cured film product of the terpolymer of Example 4 has the following properties: a Sward hardness value of 68, a 60° gloss value of 98; and a film prepared from the cured terpolymer showed good resistance to butyl acetate, 5% sodium hydroxide, and a one-half percent aqueous solution of sodium lauryl sulfate at 73° C.

The cured film product of the terpolymer of Example 5 (provided by the above procedure) showed a 60° gloss value of 100, showed a very slight crazing in eight hours on exposure to butyl acetate, showed good resistance to five percent aqueous sodium hydroxide, and showed a slight blistering within two hours to exposure to one-half percent aqueous solution of sodium lauryl sulfate at 73° C.

*Example 7*

A homopolymer of beta, beta-(bishydroxymethyl) propyl methacrylate, is also readily obtained by mile hydrolysis of the homopolymer of (2,2,5-trimethyl-5-m-dioxanyl)methacrylate. The homopolymer is obtained following conventional polymerization methods employing a bulk polymerization technique (as described in the above referred to copending application. The catalyst employed is 0.1 percent based on monomer weight of alpha, alpha'-azobis(isobutyronitrile). The preparation by hydrolysis of the homopolymer is carried on by adding one g. of the homopolymer to 17 ml. of an aqueous acetone solution consisting of 2 parts of water and 15 parts of acetone. The reaction mixture is acidified by the addition of p-toluene sulfonic acid to bring the pH to a pH of about 3. The temperature is maintained at 56° C. and the reaction is carried on for about one hour. Addition of more water is made from time to time to maintain the polymer in solution as the hydrolysis proceeds.

The provided homopolymer of beta, beta-(bishydroxymethyl)propyl methacrylate is isolated by the following procedure: The homopolymer is precipitated by the addition of either additional water or acetone. The homopolymer is removed by filtration, and is dried in vacuo.

The above procedure can be repeated to provide homopolymers and certain copolymers of the remaining monomers of Examples 1 and 2 wherein polymers of the corresponding 5-alkylene-m-dioxanyl acrylic ester are employed as starting polymers. The 2,2-dimethyl-5-m-dioxanyl rings are converted then in the procedure to the required 1,3-propane diol structure.

What is claimed is:

1. A symmetrical, polymerizable 1,3-propane diol represented by the following formula:

$$CH_2=C-CO-O-(CH_2)_n-\underset{\underset{\underset{H}{O}}{HCH}}{\overset{\overset{\overset{H}{O}}{HCH}}{C}}-R_1$$

wherein R is selected from the group consisting of hydrogen and lower alkyl radicals, $R_1$ is selected from the group consisting of lower alkyl radicals having one to four carbon atoms and hydrogen, and $n$ represents an integer of from one to four, inclusive.

2. A polymerizable compound of the formula:

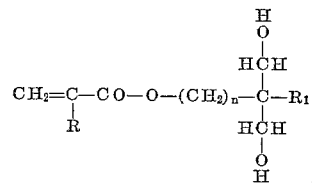

3. A polymerizable compound of the formula:

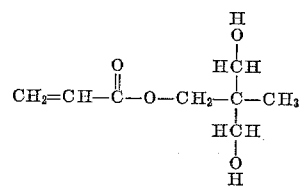

4. A polymerizable compound of the formula:

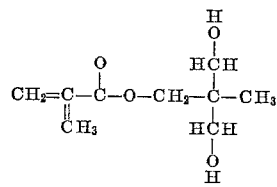

5. A polymerizable compound of the formula:

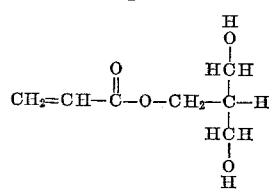

6. A polymerizable compound of the formula:

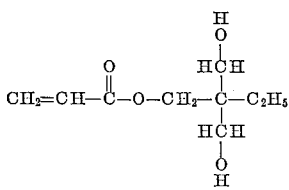

7. A polymerizable compound of the formula:

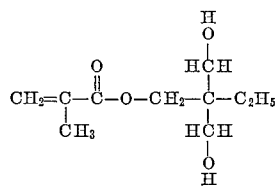

8. A polymerizable compound of the formula:

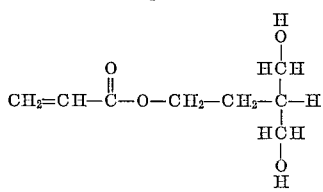

9. A polymerizable compound of the formula:

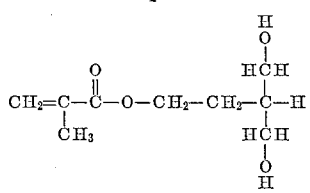

10. A polymerizable compound of the formula:

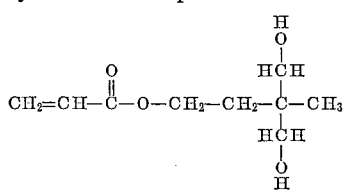

11. A polymerizable compound of the formula:

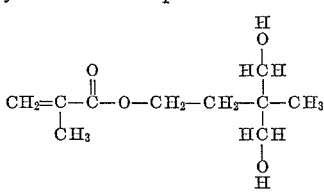

12. A homopolymer of a polymerizable compound of claim 1.
13. A homopolymer of the polymerizable compound of claim 2.
14. A homopolymer of the polymerizable compound of claim 3.
15. A homopolymer of the polymerizable compound of claim 4.
16. A homopolymer of the polymerizable compound of claim 5.
17. A homopolymer of the polymerizable compound of claim 6.
18. A homopolymer of the polymerizable compound of claim 7.
19. A homopolymer of the polymerizable compound of claim 8.
20. A homopolymer of the polymerizable compound of claim 9.
21. A homopolymer of the polymerizable compound of claim 10.
22. A homopolymer of the polymerizable compound of claim 11.
23. A copolymer of a polymerizable compound of claim 1 and a copolymerizable ethylenically unsaturated monomer of the formula $H_2C=C<$.
24. A copolymer of a polymerizable compound of claim 2 and a copolymerizable ethylenically unsaturated monomer of the formula $H_2C=C<$.
25. A copolymer of a polymerizable compound of claim 3 and a copolymerizable ethylenically unsaturated monomer of the formula $H_2C=C<$.
26. A copolymer of a polymerizable compound of claim 4 and a copolymerizable ethylenically unsaturated monomer of the formula $H_2C=C<$.
27. A copolymer of a polymerizable compound of claim 5 and a copolymerizable ethylenically unsaturated monomer of the formula $H_2C=C<$.
28. A copolymer of a polymerizable compound of claim 6 and a copolymerizable ethylenically unsaturated monomer of the formula $H_2C=C<$.
29. A copolymer of a polymerizable compound of claim 7 and a copolymerizable ethylenically unsaturated monomer of the formula $H_2C=C<$.
30. A copolymer of a polymerizable compound of claim 8 and a copolymerizable ethylenically unsaturated monomer of the formula $H_2C=C<$.
31. A copolymer of a polymerizable compound of claim 9 and a copolymerizable ethylenically unsaturated monomer of the formula $H_2C=C<$.
32. A copolymer of a polymerizable compound of claim 10 and a polymerizable ethylenically unsaturated monomer of the formula $H_2C=C<$.
33. A copolymer of a polymerizable compound of claim 11 and a copolymerizable ethylenically unsaturated monomer of the formula $H_2C=C<$.
34. A process of providing a polymerizable compound of claim 1 by acid hydrolysing a suitable 5-alkylene-m-dioxanyl acrylic ester having the formula:

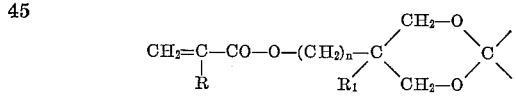

wherein R is selected from the group consisting of hydrogen and lower alkyl radicals, $R_1$ is selected from the group consisting of lower alkyl radicals having one to four carbon atoms and hydrogen, and $n$ represents an integer of from one to four, inclusive.
35. A process of claim 34 wherein the R of the hydrolysed 5-alkylene-m-dioxanyl acrylic ester is hydrogen.
36. A process of claim 34 wherein the R of the hydrolysed 5-alkylene-m-dioxanyl acrylic ester is methyl.

References Cited by the Examiner
UNITED STATES PATENTS 2,680,735  6/54  Fegley et al. _____ 260—86.1
2,924,607  2/60  Pattison _____ 260—88.3

FOREIGN PATENTS 852,384  10/60  Great Britain.

JOSEPH L. SCHOFER, *Primary Examiner.*

J. R. LIBERMAN, *Examiner.*